(12) United States Patent
Kim et al.

(10) Patent No.: US 10,923,802 B2
(45) Date of Patent: Feb. 16, 2021

(54) NEAR FIELD COMMUNICATION ANTENNA MODULE AND PORTABLE TERMINAL HAVING THE SAME

(71) Applicant: AMOTECH CO., LTD., Incheon (KR)

(72) Inventors: Beom-Jin Kim, Gyeonggi-do (KR); Byung-Guk Lim, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 250 days.

(21) Appl. No.: 15/760,545

(22) PCT Filed: Sep. 13, 2016

(86) PCT No.: PCT/KR2016/010353
§ 371 (c)(1),
(2) Date: Mar. 15, 2018

(87) PCT Pub. No.: WO2017/048062
PCT Pub. Date: Mar. 23, 2017

(65) Prior Publication Data
US 2018/0277933 A1   Sep. 27, 2018

(30) Foreign Application Priority Data

Sep. 16, 2015 (KR) .................. 10-2015-0130996
Sep. 16, 2015 (KR) .................. 10-2015-0130997

(51) Int. Cl.
*H01Q 1/24* (2006.01)
*H04B 5/00* (2006.01)
(Continued)

(52) U.S. Cl.
CPC .............. *H01Q 1/243* (2013.01); *H01Q 7/00* (2013.01); *H01Q 7/06* (2013.01); *H04B 5/0081* (2013.01)

(58) Field of Classification Search
CPC .............. H01Q 7/06; H01Q 1/243; H01Q 7/00
See application file for complete search history.

(56) References Cited

U.S. PATENT DOCUMENTS 8,159,405 B2 *   4/2012   Kimura ............... H01Q 1/2208
                                                        343/788
2005/0162331 A1 *  7/2005  Endo ................... H01Q 1/2216
                                                        343/788
(Continued)

FOREIGN PATENT DOCUMENTS

JP         2001-292025 A    10/2001
JP         2013-078144 A     4/2013
(Continued)

OTHER PUBLICATIONS

Chinese Office Action, Issue serial No. 2020043000673390.

*Primary Examiner* — Dameon E Levi
*Assistant Examiner* — Jennifer F Hu
(74) *Attorney, Agent, or Firm* — CL Intellectual LLC

(57) ABSTRACT

Disclosed are a near field communication antenna module and a portable terminal having the same, which can form a radiation pattern winding in the vertical direction or in the horizontal direction of a magnetic body to enable near field communication on a rear surface and a side surface of the portable terminal. In the disclosed near field communication antenna module, an adhesive substrate is stacked on a lower surface of a radiation substrate of a magnetic body on which the radiation pattern is formed, and a signal processing substrate and a protection substrate are stacked and formed on an upper surface of the radiation substrate, and the radiation pattern winds the magnetic body in the vertical direction or in the horizontal direction.

6 Claims, 10 Drawing Sheets

(51) Int. Cl.
  *H01Q 7/06* (2006.01)
  *H01Q 7/00* (2006.01)

(56) References Cited

U.S. PATENT DOCUMENTS

| | | | | |
|---|---|---|---|---|
| 2012/0032786 A1* | 2/2012 | Takahashi | ............... | H01Q 7/06 340/10.1 |
| 2013/0135165 A1* | 5/2013 | Yamaguchi | .............. | H01Q 7/06 343/788 |
| 2013/0229319 A1* | 9/2013 | Miura | ...................... | H01Q 9/27 343/788 |

FOREIGN PATENT DOCUMENTS

| | | |
|---|---|---|
| JP | 2013-222264 A | 10/2013 |
| KR | 10-2012-0103300 A | 9/2012 |
| KR | 10-1274354 B1 | 6/2013 |
| KR | 10-1282268 B1 | 7/2013 |
| KR | 10-1339020 B1 | 12/2013 |

* cited by examiner

NEAR FIELD COMMUNICATION ANTENNA MODULE AND PORTABLE TERMINAL HAVING THE SAME

CROSS-REFERENCE TO THE RELATED APPLICATIONS

This application is a National Stage of International Application No. PCT/KR2016/010353, filed Sep. 13, 2016, which claims priority from Korean Patent Application Nos. 10-2015-0130996 and 10-2015-0130997 filed on Sep. 16, 2015 in the Korean Intellectual Property Office, the disclosures of which are incorporated herein by reference in their entirety.

TECHNICAL FIELD

Exemplary embodiments of the present disclosure relate to a near field communication antenna module and a portable terminal having the same, and more particularly, to a near field communication antenna module and a portable terminal having the same that are embedded in the portable terminal to perform communication with a different terminal.

BACKGROUND ART

Along with the technology development, portable terminals, such as a cell phone, a PDA, a PMP, a navigator, and a laptop, additionally provide the functions, such as a DMB, a wireless internet, near field communication between the devices, in addition to fundamental functions, such as call, video/music playbacks, and navigation.

Accordingly, various types of near field communication antenna, such as Near Field Communication (NFC) antenna and a Magnetic Secure Transmission (MST) antenna are mounted in the portable terminal.

The NFC antenna is a contactless near field communication module using the frequency band of about 13.56 MHz, and transmits data between the terminals at a close distance of about 10 cm or less. The NFC antenna, other than payment, is widely used for transmission of product information at a supermarket or a store and travel information for a visitor, transportation, a lock device for access control and the like.

The MST antenna is an antenna transmitting/receiving data for payment using a portable terminal, such as Samsung Pay.

Generally, as illustrated in FIG. 1, a conventional near field communication antenna 10 is made of a planar winding structure having a radiation pattern 14 formed on one surface of a substrate 12 in order to obtain communication performance. In this case, since the conventional near filed communication antenna is made of a planar winding structure, a large area is formed for obtaining communication performance.

The near field communication antenna is mounted on a rear cover of a portable terminal, a battery pack and the like. In this case, as illustrated in FIG. 2, since the near field communication antenna module is made of a planar winding structure, it is possible to generate a radiation field in the vertical direction of the substrate to enable near field communication only on a rear surface of a portable terminal 20.

As illustrated in FIG. 3, in recent years, as the user environment has become diverse, a structure of the portable terminal 20 capable of performing near field communication on the side surface as well as the rear surface has been required.

Accordingly, antenna development companies are studying the direction of recognition, and the antenna with various structures that enable near field communication from the side surface of the terminal have been developed.

As one example, a vertical winding type structure has been developed in which the coils are wound around a magnetic sintered body to enable near field communication from the rear surface and the side surface of a portable terminal.

However, the near field communication antenna of a conventional vertical winding type structure has a problem in that it is difficult to mount the antenna in a portable terminal with a tendency to be miniature due to an increase in the thickness of the antenna due to the coil winding.

Further, in some cases, the MST antenna should implement the inductance of about 4 to 30 uH level, and there is a problem that an appropriate level of the inductance cannot be implemented in the structure in which the coils are wound around a compact magnetic sintered body.

As another example, a spiral shape of antenna module (hereinafter, a spiral antenna module) has been developed. The spiral antenna module is made of a structure forming a spiral shape of a radiation pattern inside ferrite in order to implement a 4 to 30 uH level of the inductance required for the MST antenna and the NFC antenna.

However, the conventional spiral antenna module has a problem that a magnetic field is weakened due to the shielding effect of ferrite although a high inductance required can be implemented because a radiation pattern is formed inside the ferrite.

Further, the conventional spiral antenna module should implement an inductor in LTCC in order to prevent performance deterioration due to a ground metal of the lower portion thereof, and adhere the ferrite sheet. In this case, there is a problem that the co-firing of the spiral antenna module is difficult, and the glue should be used.

DISCLOSURE

Technical Problem

The present disclosure is proposed to solve the above conventional problems, and an object of the present disclosure is to provide a near field communication antenna module and a portable terminal having the same that form a radiation pattern winding in the vertical direction or in the horizontal direction of a magnetic body to enable near field communication on a rear surface and a side surface of the portable terminal.

Technical Solution

For achieving the object, a near field communication antenna module in accordance with an embodiment of the present disclosure includes a radiation substrate of a magnetic body on which a radiation pattern is formed; an adhesive substrate formed on a lower surface of the radiation substrate; and a signal processing substrate stacked on an upper surface of the radiation substrate.

The radiation substrate can include a base substrate of a magnetic sintered body; and a radiation pattern winding the base substrate. In this case, the radiation substrate can further include a terminal portion formed on the upper surface of the base substrate, and connected to one end of the radiation pattern; and another terminal portion spaced apart from the terminal portion and formed on the upper surface of the base substrate, and connected to the other end of the radiation pattern. Herein, the radiation pattern can sequentially wind the upper surface, one side surface, a lower surface, and the other side surface of the base substrate to wind the base substrate in the vertical direction, or can sequentially wind the side surfaces of the base substrate to wind the base substrate in the horizontal direction. The radiation pattern can be made of a conductive material printed on the base substrate, or a wire wound on the base substrate.

Meanwhile, the radiation substrate can include a first magnetic sheet having a plurality of first linear patterns spaced apart from each other and formed on the upper surface thereof; a second magnetic sheet having a plurality of second linear patterns spaced apart from each other and formed on a lower surface thereof, and stacked on a lower surface of the first magnetic sheet; one or more third magnetic sheets interposed between the first magnetic sheet and the second magnetic sheet; and a plurality of side surface patterns formed on both side portions of the magnetic laminate on which the first magnetic sheet to the third magnetic sheet are stacked, and connecting the first linear pattern and the second linear pattern. In this case, the radiation substrate can further include a terminal portion formed on the upper surface of the first magnetic sheet, and connected to one of the plurality of the first linear patterns; and the another terminal portion spaced apart from the terminal portion and formed on the upper surface of the first magnetic sheet, and connected to the other one of the plurality of first linear patterns.

On the other hand, the radiation substrate can be configured to have the plurality of the magnetic sheets on which a loop pattern is formed, stacked on one surface thereof, and the loop pattern can be connected with at least one of the loop patterns formed on the magnetic sheet stacked on an upper portion thereof and the magnetic sheet stacked on a lower portion thereof.

In this case, the radiation substrate can include a terminal portion formed on the upper surface of the magnetic sheet stacked on the uppermost portion thereof, and connected with the loop pattern of the magnetic sheet stacked on the uppermost portion thereof; and the another terminal portion spaced apart from the terminal portion and formed on the upper surface of the magnetic sheet stacked on the uppermost portion thereof, and connected with the loop pattern of the magnetic sheet stacked on the lowermost portion thereof through a via hole.

Herein, the magnetic sheet stacked on the lowermost portion of the plurality of the magnetic sheets is formed at a thicker thickness than other magnetic sheets.

The adhesive substrate can be made of an aluminum material.

The signal processing substrate can include a printed circuit board; a signal processing device mounted on an upper surface of the printed circuit board; a circuit pattern formed on the printed circuit board, and connected with the signal processing device; a terminal pattern formed on a lower surface of the printed circuit board, and connected to one end of the circuit pattern through a via hole; and the another terminal pattern spaced apart from the terminal pattern and formed on the lower surface of the printed circuit board, and connected to the other end of the circuit pattern through the via hole. In this case, the terminal pattern can have the other surface connected with the terminal portion formed on the upper surface of the radiation substrate, and the another terminal pattern can have the other surface connected with the another terminal portion formed on the upper surface of the radiation substrate.

The near field communication antenna module in accordance with the embodiment of the present disclosure can further include a protection substrate stacked on the upper surface of the signal processing substrate.

For achieving the object, a portable terminal including the near field communication antenna module in accordance with the embodiment of the present disclosure includes a portable terminal body; a rear cover mounted on a rear surface of the portable terminal body; and a near field communication antenna module having a magnetic body and a radiation pattern winding the magnetic body, and mounted on a portable terminal body or the rear cover.

In this case, the near field communication antenna module can be mounted to be biased in one side surface direction on the center of the portable terminal body, and mounted to be spaced apart from one side surface of the portable terminal body, or the near field communication antenna module can be mounted to be biased in one side surface direction on the center of the rear cover thereof, and mounted to be spaced apart from one side surface of the rear cover.

The near field communication antenna module can include a magnetic sintered body; and a radiation pattern winding the magnetic sintered body in the vertical direction or in the horizontal direction, or include a magnetic laminate on which the plurality of the magnetic sheets are stacked, and a radiation pattern winding the magnetic laminate in the vertical direction or in the horizontal direction.

Advantageous Effects

In accordance with the present disclosure, there is the effect in that the near field communication antenna module can form the radiation pattern winding the magnetic body in the vertical direction or in the horizontal direction, thus generating the magnetic field on the rear surface and the side surface of the portable terminal to maximize the recognition rate of the near field communication signal (for example, the NFC signal and the MST signal).

Further, there is the effect in that the near field communication antenna module can form the radiation pattern in the vertical direction or in the horizontal direction of the magnetic body, thus implementing a high inductance, and making the line width relatively thick to implement a low resistance and a chip type antenna operating without thermal loss in the low frequency, such as NFC and MST.

Further, there is the effect in that the near field communication antenna module can form the radiation pattern inside the magnetic body, thus simplifying the production process to enhance the production yield, and to minimize the manufacturing costs compared to the conventional antenna module.

Further, in the near field communication antenna module, the radiation pattern formed on the magnetic sheet stacked on the uppermost portion thereof can be exposed to the outside, and the radiation patterns formed on the remaining magnetic sheets can be located inside the magnetic material (for example, ferrite and the like), thus implementing a high inductance required and preventing the magnetic field from becoming weak.

Further, in the near field communication antenna module, the magnetic sheet stacked on the lowermost portion thereof is formed at a thicker thickness than the other magnetic sheets, or the magnetic sheet is formed to have the same thickness as the other magnetic sheets, one or more magnetic sheets on which the radiation pattern is not formed are stacked on a lower surface of the magnetic sheet stacked on the lowermost portion thereof, thus implementing an inductor in LTCC, and unlike the conventional spiral antenna module to which the ferrite sheet is adhered, implementing the desired inductance characteristic by changing the number of turning, a line width, a line spacing, and the like of the radiation patterns located inside the magnetic sheet, and blocking the formation of the magnetic field in the direction of the lower portion thereof without adhering the LTCC or the ferrite sheet to prevent performance deterioration due to a ground metal of the lower portion thereof.

Further, there is the effect in that the near field communication antenna module can connect the radiation patterns formed on the stacked magnetic sheets through a via hole to be formed through co-firing, thus omitting the process of further adhering the LTCC or the ferrite sheet to simplify the production process to enhance the production yield, and to minimize the manufacturing costs compared to the conventional antenna module.

Further, there is the effect in that the near field communication antenna module can be formed by integrating the radiator and the signal processing device, thus simplifying the process of mounting it in the portable terminal to enhance the production yield.

MODE FOR INVENTION

Figure 1:
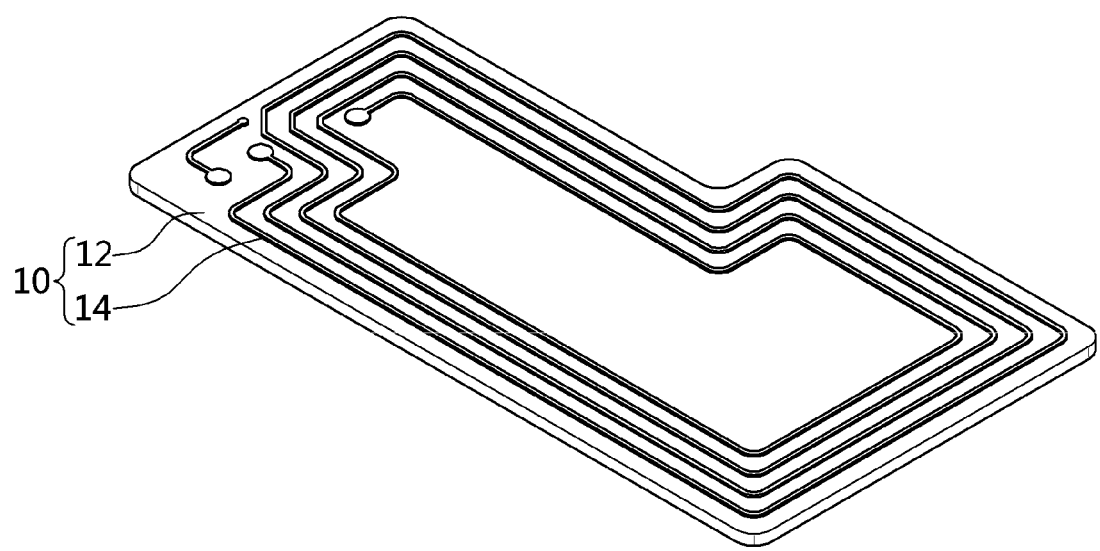
FIGS. 1 to 3 are views explaining a conventional near field communication antenna module.
Figure 2:
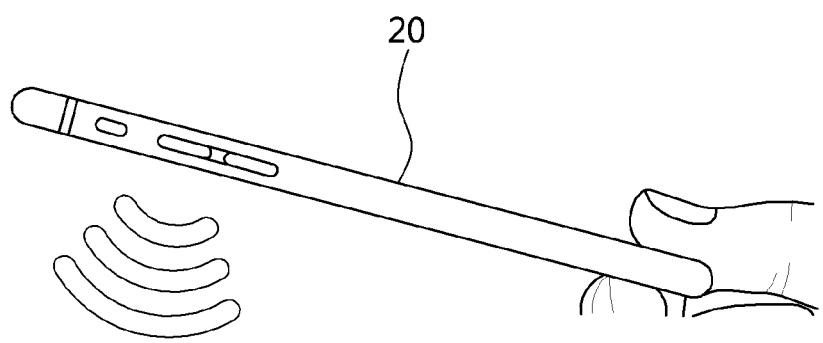
Figure 3:
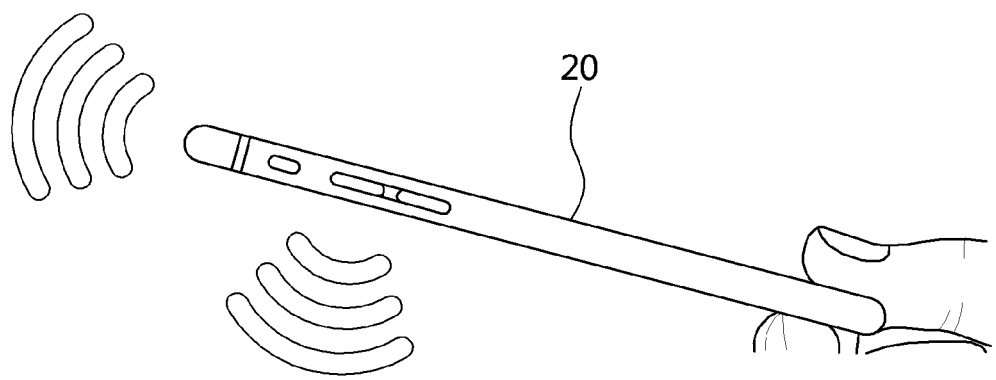

Hereinafter, for detailed explanation to the extent that a person skilled in the art to which the present disclosure pertains can easily embody the technical spirit of the present disclosure, the most preferred embodiments of the present disclosure will be described in detail with reference to the accompanying drawings. First, it should be noted that in denoting reference numerals to the elements in each drawing, the same elements have the same reference numerals if possible even though illustrated in different drawings. Further, in explaining the present disclosure, detailed description of related known configurations or functions will be omitted if it obscures the subject matter of the present disclosure.

Figure 4:
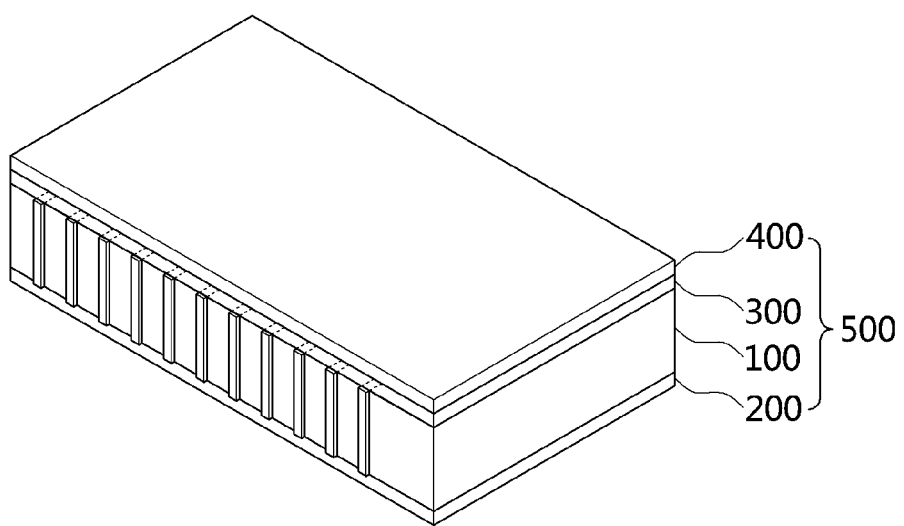
FIGS. 4 and 5 are views explaining a near field communication antenna module in accordance with an embodiment of the present disclosure.
Figure 5:
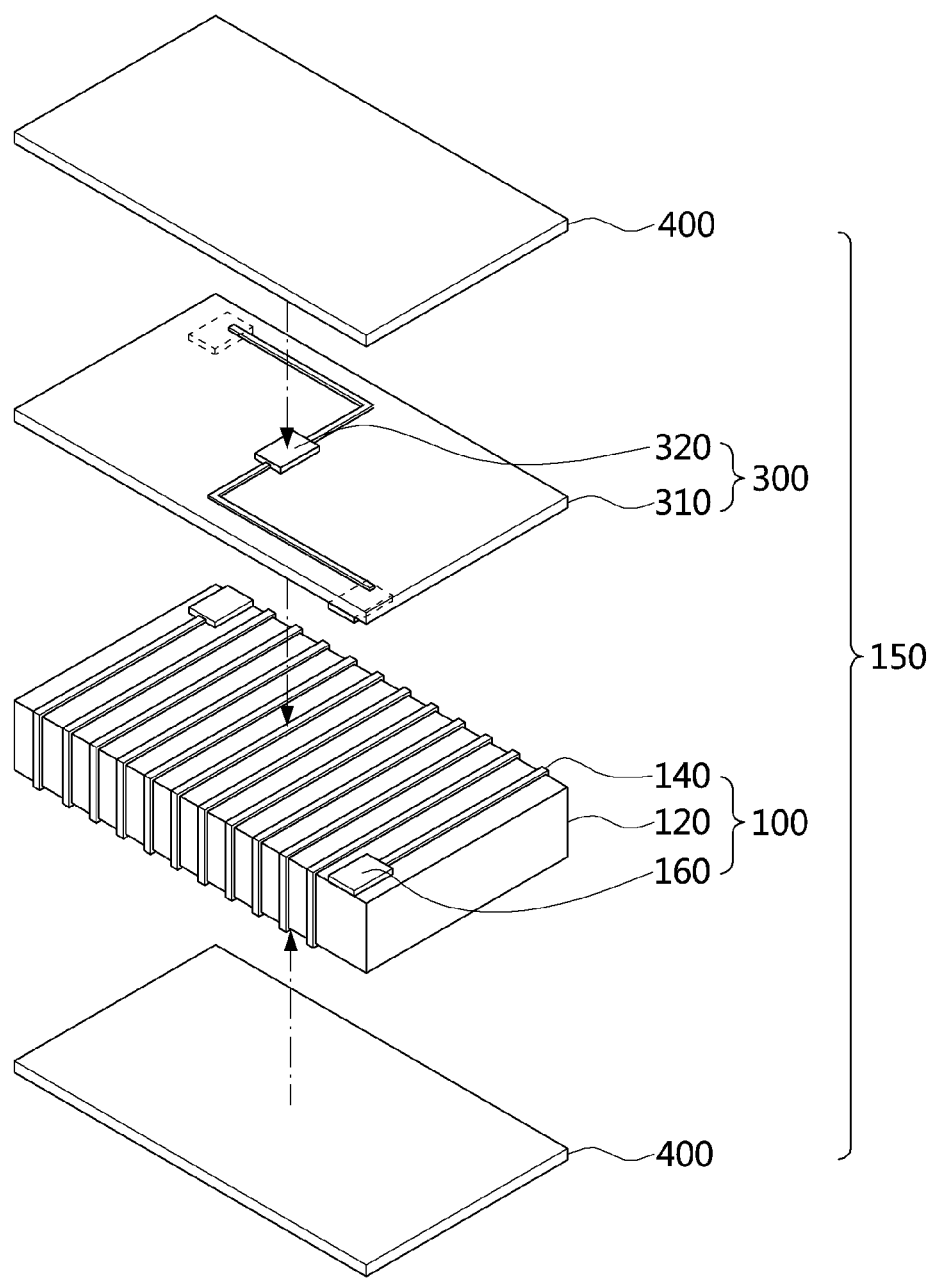

Referring to FIGS. 4 and 5, a near field communication antenna module 500 in accordance with an embodiment of the present disclosure is configured to include a radiation substrate 100, an adhesive substrate 200, a signal processing substrate 300, and a protection substrate 400.

A radiation substrate 100 is composed of a base substrate 120 on which the radiation pattern 140 is formed. In this case, the base substrate 120 can be made of a magnetic material, such as ferrite, and composed of a magnetic laminate stacking a magnetic sintered body obtained by firing a magnetic powder or a magnetic sheet 121. The radiation pattern 140 is formed on the base substrate 120 through a printing process or a winding process, and formed in the shape winding in the vertical direction or in the horizontal direction of the base substrate 120. In this case, both ends of the radiation pattern 140 are connected to terminal portions 160 formed on an upper surface of the radiation substrate 100.

Figure 6:
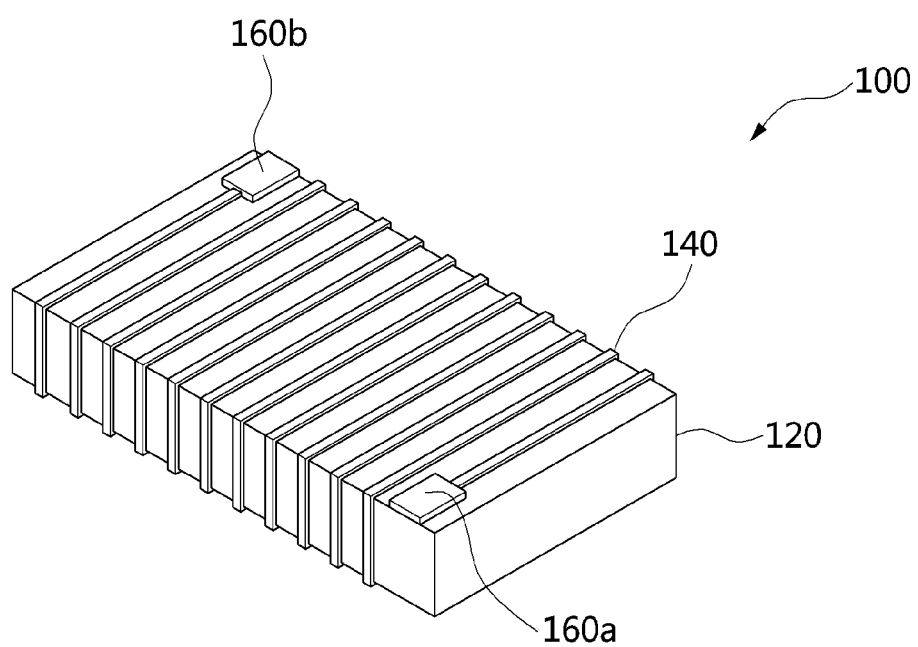
FIGS. 6 to 9 are views explaining a radiation substrate of FIG. 5.

Referring to FIG. 6, the radiation substrate 100 can be composed of the base substrate 120 and the radiation pattern 140 winding the base substrate 120 in the vertical direction.

The base substrate 120 is composed of the magnetic sintered body obtained by firing the magnetic material, such as ferrite. That is, the base substrate 120 is composed of the magnetic sintered body obtained by firing the magnetic material and having a predetermined shape (for example, a square).

An upper surface of the base substrate 120 is formed with the plurality of the terminal portions 160 spaced apart from each other. That is, the radiation substrate 100 is formed with the plurality of the terminal portions 160 connected with the radiation pattern 140 on the upper surface of the base substrate 120 (i.e., one surface on which the signal processing substrate 300 is mounted).

In this case, the terminal portion 160 can be configured to include a first terminal portion 160a and a second terminal portion 160b connected to both ends of the radiation pattern 140, respectively. Herein, if a near field communication antenna uses a multi-band antenna, such as NFC and MST, it can be configured to include three or more terminal portions 160.

The radiation pattern 140 is wound in the vertical direction of the base substrate 120. That is, the radiation pattern 140 is formed in the shape winding the base substrate 120 in the vertical direction by sequentially winding the upper surface, one side surface, a lower surface, and the other side surface of the base substrate 120.

In this case, the radiation pattern 140 can be formed by printing a conductive material on a surface of the base substrate 120, or winding a wire on the surface of the base substrate 120.

Figure 7:
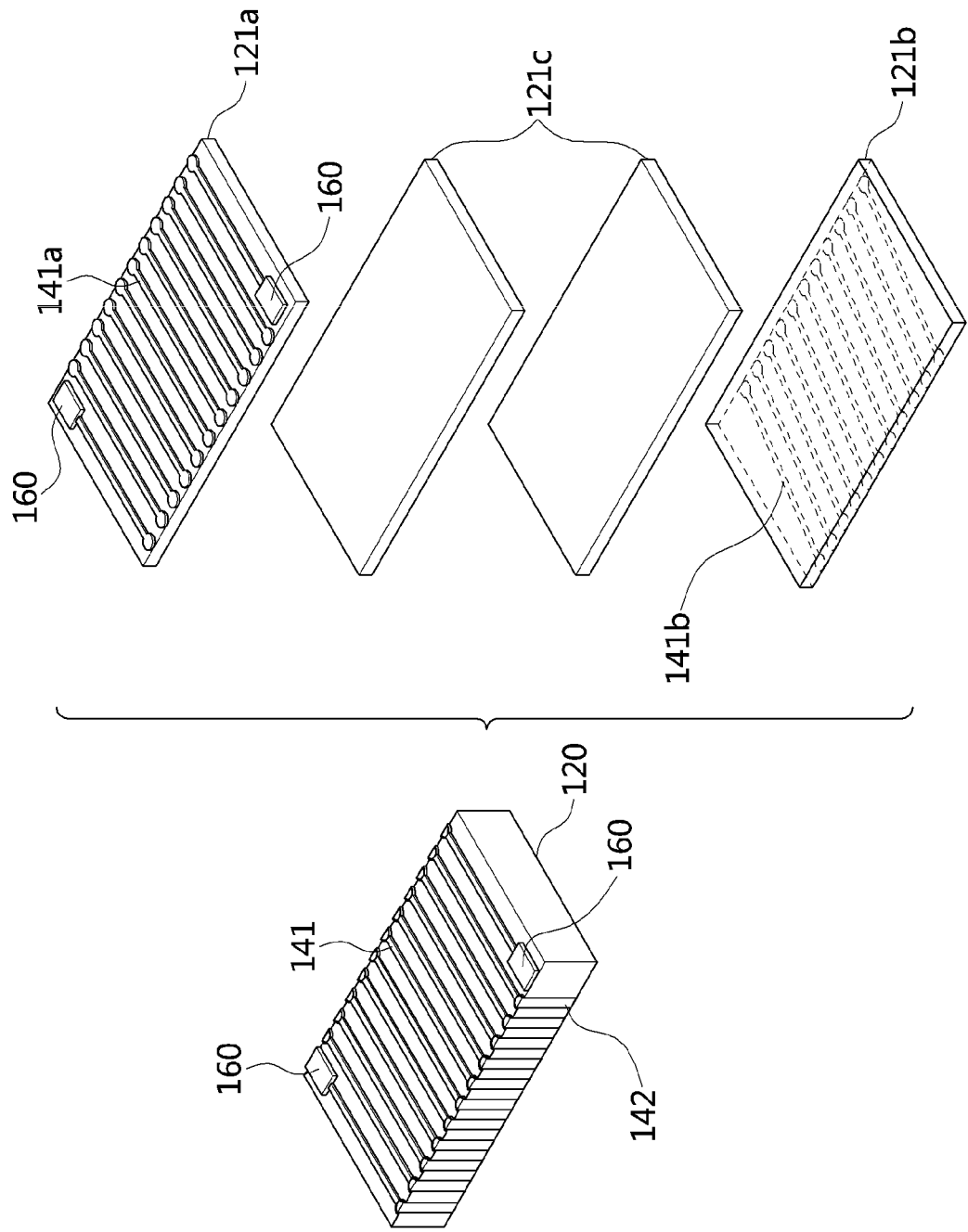

Referring to FIG. 7, the radiation substrate 100 can be composed of the base substrate 120 of the magnetic laminate on which the plurality of the magnetic sheets 121 are stacked, and the radiation patterns 140 that linear patterns 141 formed on the magnetic sheets 121 are connected through a via hole to wind the magnetic laminate in the vertical direction. In this case, an adhesive sheet (not shown) can be interposed between the magnetic sheets 121 for the adhesion of the magnetic sheets 121.

The magnetic laminate is composed of a first magnetic sheet 121a, a second magnetic sheet 121b stacked on a lower surface of the first magnetic sheet 121a, and one or more third magnetic sheets 121c interposed between the first magnetic sheet 121a and the second magnetic sheet 121b. In this case, the first magnetic sheet 121a has a plurality of first linear patterns 141a spaced apart from each other and formed on an upper surface thereof, and is formed with the plurality of the terminal portions 160 connected with the first linear patterns 141a different from each other. In this case, one ends of the first linear patterns 141a formed on the outermost side thereof are connected to the terminal portions 160 different from each other, respectively. The second magnetic sheet 121b has a plurality of second linear patterns 141b spaced apart from each other and formed on a lower surface thereof. The third magnetic sheet 121c is composed of a plurality of layers, and interposed between the first magnetic sheet 121a and the second magnetic sheet 121b.

As the first magnetic sheet 121a to the third magnetic sheet 121c are stacked, the magnetic laminate has the plurality of the first linear patterns 141a spaced apart from each other and the terminal portion 160 formed on the upper surface thereof, and has the plurality of the second linear pattern 141b spaced apart from each other and formed on the lower surface thereof.

The magnetic laminate has a plurality of via holes formed on both side portions thereof. That is, the magnetic laminate is formed with the plurality of via holes through a punching process, and the via hole is filled with a conductive material. In this case, by etching a part of both side portions of the magnetic laminate and exposing the conductive material filled in the via hole to the outside, a side surface pattern 142 connecting the first linear pattern 141a and the second linear pattern 141b is formed.

Of course, the side surface pattern 142 can be also formed by printing the conductive material on the side surface while the magnetic laminate is inserted into a jig.

As the side surface pattern 142 is formed on the magnetic laminate, the radiation pattern 140 (i.e., the first linear pattern 141a, the second linear pattern 141b, and the side surface pattern 142) of the shape winding in the vertical direction is formed.

Figure 8:
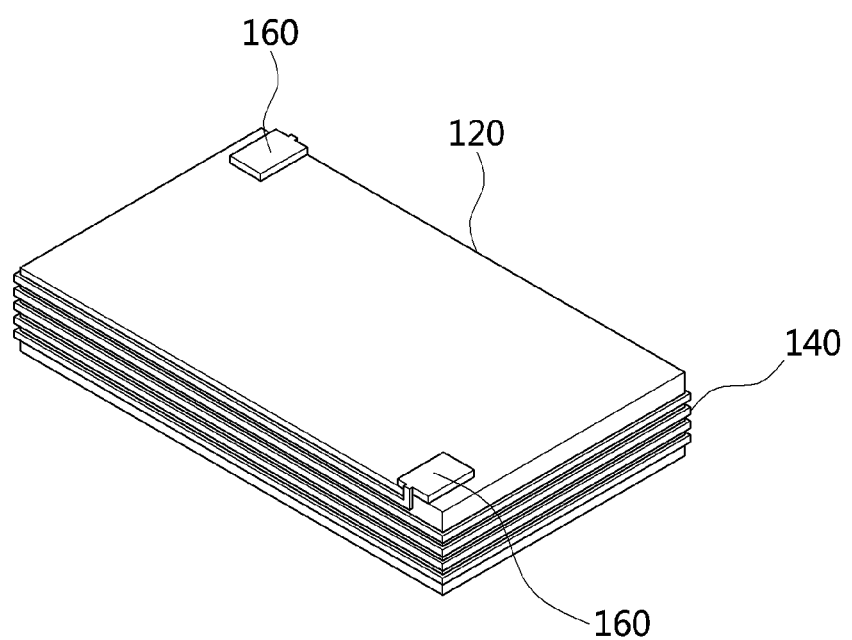

Referring to FIG. 8, the radiation substrate 100 can be composed of the base substrate 120 and the radiation pattern 140 winding the base substrate 120 in the horizontal direction. Herein, since the base substrate 120 is the same as the base substrate 120 described above in FIG. 6, the detailed description thereof will be omitted.

The radiation pattern 140 is wound in the horizontal direction of the base substrate 120. That is, the radiation pattern 140 is formed in the shape that winds the side surfaces of the base substrate 120 to wind the base substrate 120 in the horizontal direction. In this case, the radiation pattern 140 can be formed by printing the conductive material on the surface of the base substrate 120, or winding a wire on the surface of the base substrate 120.

Figure 9:
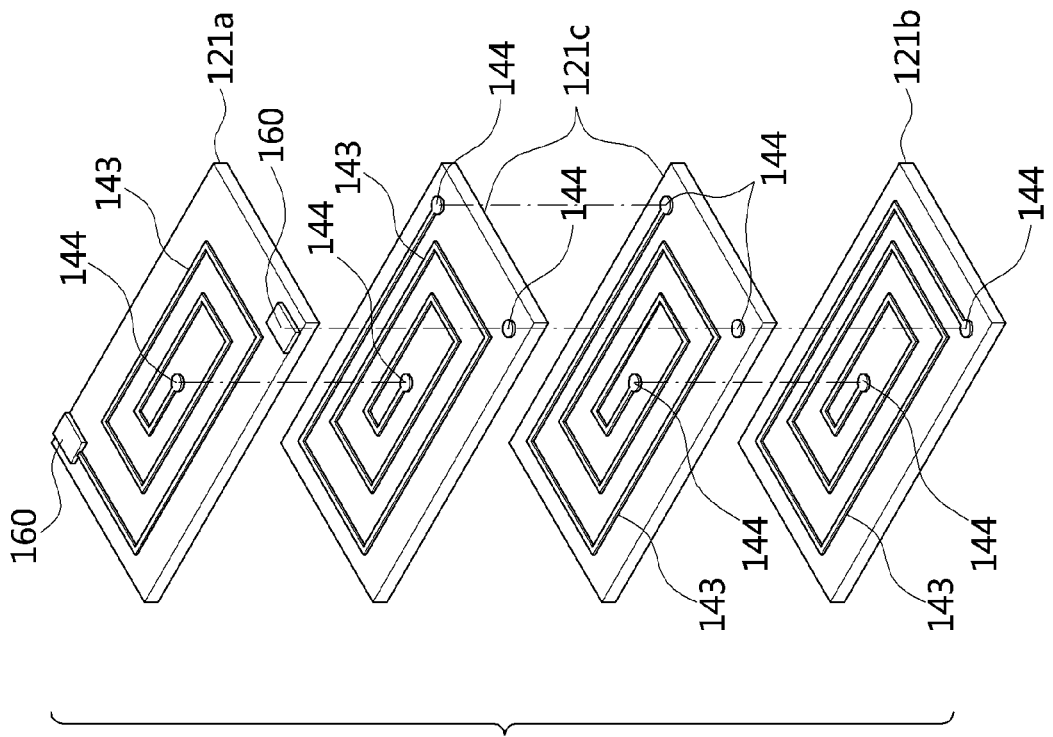
Figure 9:
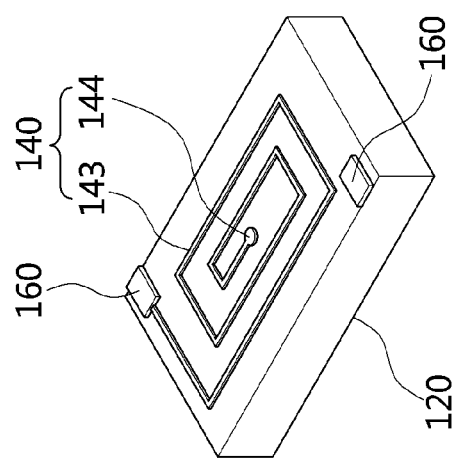

Referring to FIG. 9, the radiation substrate 100 can be composed of the base substrate 120 of the magnetic laminate on which the plurality of the magnetic sheets 121 are stacked, and a spiral shape of the radiation pattern 140 that the linear patterns 141 formed on the magnetic sheet 121 are connected through a via hole 144 to wind the base substrate 120 in the horizontal direction. In this case, an adhesive sheet (not shown) can be interposed between the magnetic sheets 121 for the adhesion of the magnetic sheets 121.

The magnetic sheet 121 is formed with a spiral shape of a loop pattern 143. In this case, the magnetic sheet 121 stacked on the uppermost portion (hereinafter, the first magnetic sheet 121a) thereof is formed with the plurality of the terminal portions 160 spaced apart from each other. The loop pattern 143 formed on the first magnetic sheet 121a has one end connected to the terminal portion 160, and the other end connected with one end of the loop pattern 143 formed on the magnetic sheet 121 stacked on the lower portion thereof through the via hole 144.

The loop pattern 143 formed on the magnetic sheets 121 stacked on the lowermost portion (hereinafter, a second magnetic sheet 121b) thereof has one end connected with the other end of the loop pattern 143 formed on the magnetic sheet 121 stacked on the upper portion through the via hole 144, and the other end connected with another terminal portion 160 of the magnetic sheet 121 stacked on the uppermost portion thereof through the via hole 144.

The loop pattern 143 formed on the magnetic sheets 121 interposed between the uppermost magnetic sheet 121 and the lowermost magnetic sheet 121 (hereinafter, a third magnetic sheet 121c) has one end connected with the other end of the loop pattern 143 of the magnetic sheet 121 stacked on the upper portion thereof, and the other end connected with one end of the loop pattern 143 of the magnetic sheet 121 stacked on the lower portion thereof. In this case, the third magnetic sheets 121c are formed with the via hole 144 connecting the another terminal portion 160 of the first magnetic sheet 121a with the other end of the second magnetic sheet 121b.

The radiation substrate 100 is formed through co-firing after forming the via hole, and the loop pattern 143 formed on the first magnetic sheet 121a is exposed to the outside.

Meanwhile, the second magnetic sheet 121b is formed to be thicker than other magnetic sheets 121. Of course, the second magnetic sheet 121b is formed to have the same thickness as other magnetic sheets 121, and one or more magnetic sheets 121 on which the loop pattern 143 is not formed can be also stacked on a lower surface of the second magnetic sheet 121b. Herein, the second magnetic sheet 121b can be also formed of a magnetic material of the characteristic different from other magnetic sheets 121.

Thus, in the near field communication antenna module 500, the radiation pattern 140 formed on the magnetic sheet 121 stacked on the uppermost portion thereof can be exposed to the outside, and the loop patterns 143 formed on the remaining magnetic sheets 121 can be located inside the magnetic material (for example, ferrite and the like), thus implementing a high inductance required and preventing the magnetic field from becoming weak.

An adhesive substrate 200 is the substrate for bonding the near field communication antenna module 500 to the portable terminal, and is bonded to the lower surface of the radiation substrate 100. That is, the adhesive substrate 200 is made of an adhesive tape of an aluminum (Al) material. The adhesive substrate 200 has one surface adhered to the lower surface of the radiation substrate 100, and the other surface adhered to the portable terminal.

A signal processing substrate 300 is configured to include a printed circuit board (PCB) 310 and a signal processing device 320.

Figure 10:
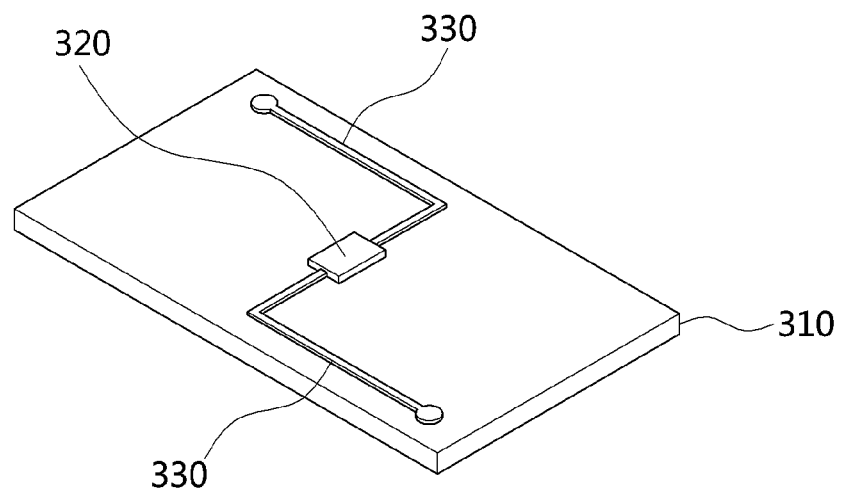
FIGS. 10 to 12 are views explaining a signal processing substrate of FIG. 5.
Figure 11:
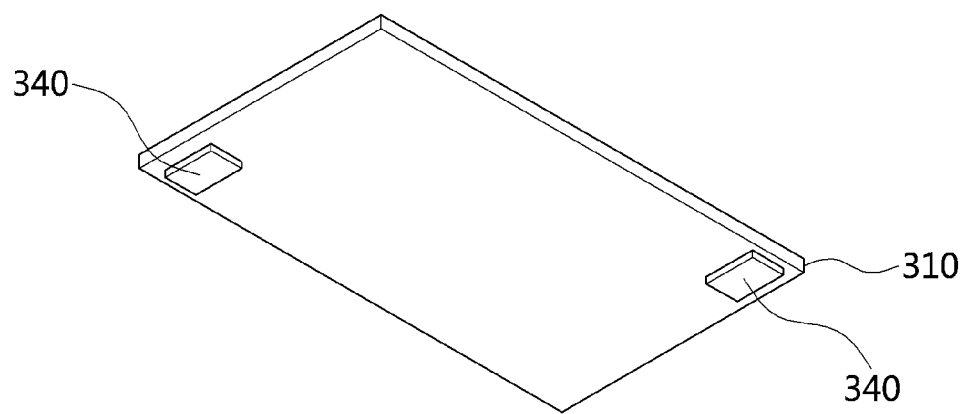
Figure 12:
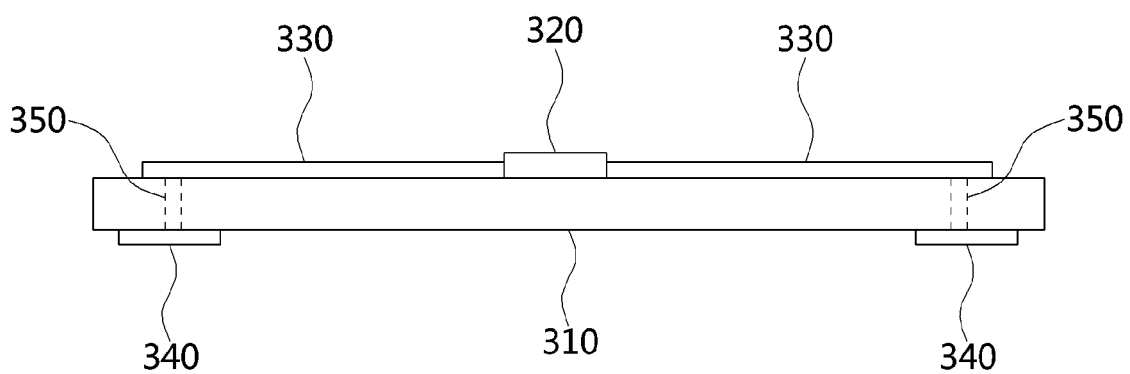

Referring to FIGS. 10 to 12, the signal processing substrate 300 has the signal processing device 320 mounted on an upper surface of the printed circuit board 310, and formed with a predetermined shape of a circuit pattern 330 connected with the signal processing device 320.

In this case, the signal processing device 320 processes a near field communication signal received through the radiation substrate 100, and is mounted on the PCB by a Chip. On Board (COB) scheme or a direct bonding scheme.

The lower surface of the printed circuit board 310 is formed with a plurality of terminal patterns 340 connected with the terminal portion 160 of the radiation substrate 100. In this case, the terminal patterns 340 are configured in a number corresponding to the terminal portions 160 of the radiation substrate 100 to be formed on corresponding locations to the terminal portions 160. Herein, the circuit pattern 330 formed on the upper surface of the printed circuit board 310 and the terminal patterns 340 formed on the lower surface thereof are connected through a via hole 350 penetrating the printed circuit board 310.

Accordingly, the near field communication signal applied from the radiation substrate 100 through the terminal pattern 340 is applied to the signal processing device 320 through the circuit pattern 330, and the signal processing device 320 processes the applied near field communication signal in a predetermined method to be applied to a portable terminal body (not shown).

A protection substrate 400 is formed on the upper surface of the signal processing substrate 300 to protect the signal processing device 320. For this purpose, the protection substrate 400 can be made of a material generally used for molding, such as acryl, PVC, PEM, silicon, rubber, and polyethylene.

Meanwhile, in the near field communication antenna module 500, the adhesive substrate 200 can be also stacked on the upper surface of the signal processing substrate 300. That is, the adhesive substrate 200 can be stacked on the upper surface of the signal processing substrate 300 to simultaneously perform the function of adhering the near field communication antenna module 500 to the portable terminal and the function of protecting the signal processing device 320. In this case, the protection substrate 400 can be also omitted in the configuration.

Figure 13:
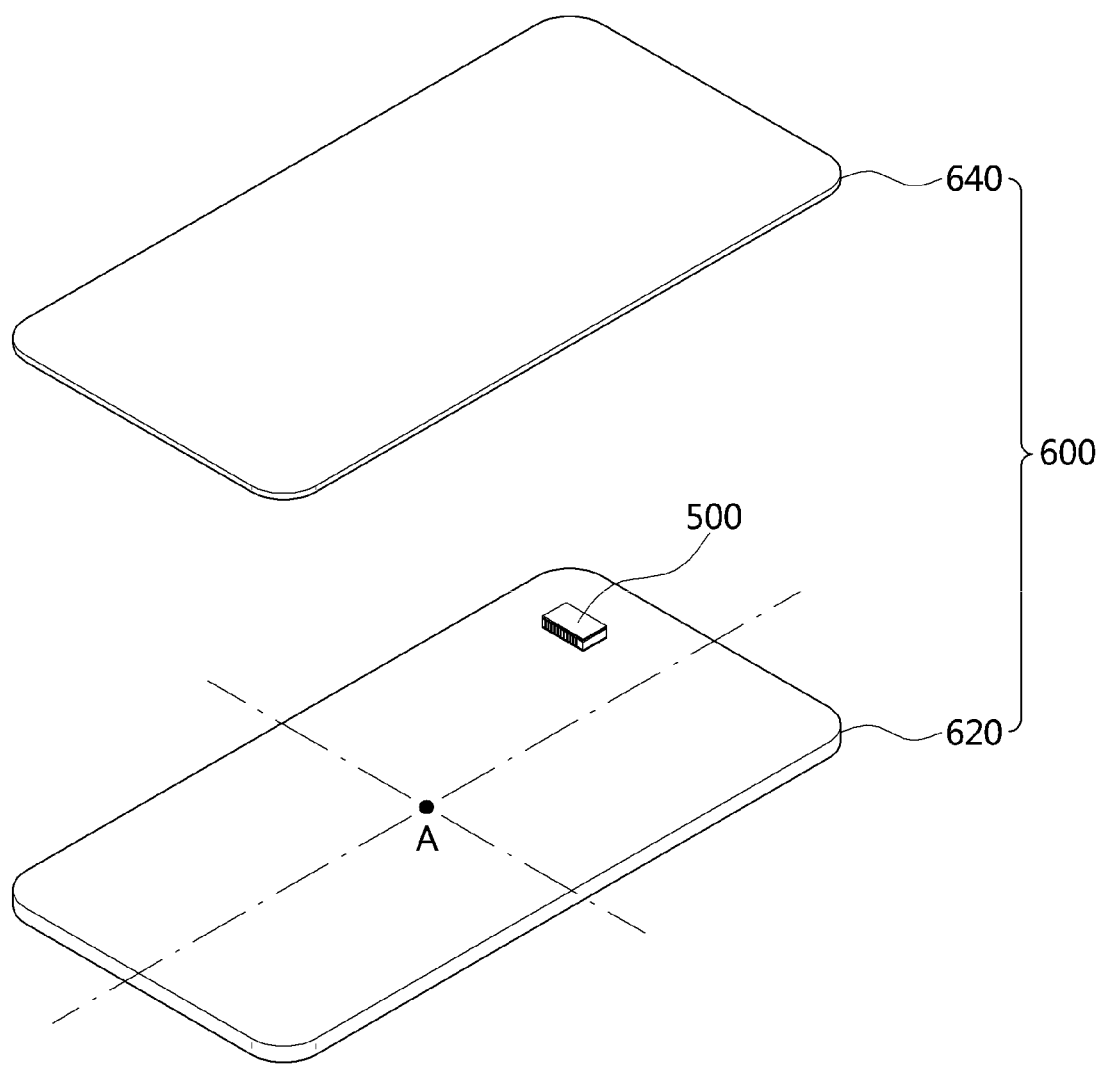
FIG. 13 is a view explaining a portable terminal having the near field communication antenna module in accordance with the embodiment of the present disclosure.

Referring to FIG. 13, a portable terminal 600 having the near field communication antenna module 500 in accordance with the embodiment of the present disclosure is configured to include a portable terminal body 620, a rear cover 640, and the near field communication antenna module 500.

The near field communication antenna module 500 is mounted adjacent to a side surface of the portable terminal body 620. In this case, the near field communication antenna module 500 is mounted to be biased in one side surface direction from the center (A) of the portable terminal body 620. The near field communication antenna module 500 is mounted to have one side spaced at a predetermined interval apart from one side surface of the portable terminal body 620. As one example, the near field communication antenna module 500 can be mounted to be interposed between a camera module or a flash module mounted adjacent to the side surface of the portable terminal body 620 and the side surface of the portable terminal body 620.

Meanwhile, the near field communication antenna module 500 can be also mounted adjacent to the side surface of the rear cover 640. In this case, the near field communication antenna module 500 is mounted to be biased in one side surface direction from the center of the rear cover 640. The near field communication antenna module 500 is mounted to have one side spaced at a predetermined interval apart from one side surface of the rear cover 640.

Accordingly, even if the user touches a POS terminal or another portable terminal 600 in close proximity to the rear surface of the portable terminal 600 for the electronic payment or the near field communication, or the user approaches the side surface of the portable terminal 600 while holding the portable terminal 600, the electronic payment or the near field communication is enabled.

In this case, the near field communication antenna module 500 is implemented by an independent antenna to operate as an antenna for the electronic payment or the near field communication, or is connected to a MST antenna or a NFC antenna formed on the portable terminal 600 to operate as an auxiliary antenna.

As described above, there is the effect in that the near field communication antenna module can form the radiation pattern winding the magnetic body in the vertical direction or in the horizontal direction, thus generating the magnetic field on the rear surface and the side surface of the portable terminal to maximize the recognition rate of the near field communication signal (for example, the NFC signal and the MST signal).

Further, there is the effect in that the near field communication antenna module can form the radiation pattern in the vertical direction or in the horizontal direction of the magnetic body, thus implementing a high inductance, and making the line width relatively thick to implement a low resistance and a chip type antenna operating without thermal loss in the low frequency, such as NFC and MST.

Further, there is the effect in that the near field communication antenna module can form the radiation pattern inside the magnetic body, thus simplifying the production process to enhance the production yield, and to minimize the manufacturing costs compared to the conventional antenna module.

Further, in the near field communication antenna module, the radiation pattern formed on the magnetic sheet stacked on the uppermost portion thereof can be exposed to the outside, and the radiation patterns formed on the remaining magnetic sheets can be located inside the magnetic material (for example, ferrite and the like), thus implementing a high inductance required and preventing the magnetic field from becoming weak.

Further, in the near field communication antenna module, the magnetic sheet stacked on the lowermost portion thereof is formed at a thicker thickness than the other magnetic sheets, or the magnetic sheet is formed to have the same thickness as the other magnetic sheets, one or more magnetic sheets on which the radiation pattern is not formed are stacked on the lower surface of the magnetic sheet stacked on the lowermost portion, thus implementing an inductor in LTCC, and unlike the conventional spiral antenna module to which the ferrite sheet is adhered, implementing the desired inductance characteristic by changing the number of turning, a line width, a line spacing, and the like of the radiation patterns located inside the magnetic sheet, and blocking the formation of the magnetic field in the direction of the lower portion thereof without adhering the LTCC or the ferrite sheet to prevent performance deterioration due to a ground metal of the lower portion thereof.

Further, there is the effect in that the near field communication antenna module can connect the radiation patterns formed on the stacked magnetic sheets through a via hole to be formed through co-firing, thus omitting the process of further adhering the LTCC or the ferrite sheet to simplify the production process to enhance the production yield, and to minimize the manufacturing costs compared to the conventional antenna module.

Further, there is the effect in that the near field communication antenna module can be formed by integrating the radiator and the signal processing device, thus simplifying the process of mounting it in the portable terminal to enhance the production yield.

While the present disclosure has been described with respect to the specific embodiments, it will be apparent to those skilled in the art that various changes and modifications may be made without departing from the spirit and scope of the disclosure as defined in the following claims.

The invention claimed is:

1. A near field communication antenna module, comprising:
    a radiation substrate of a magnetic body on which a radiation pattern is formed;
    an adhesive substrate formed on a lower surface of the radiation substrate; and
    a signal processing substrate stacked on an upper surface of the radiation substrate to be integrated with the radiation substrate, wherein the radiation substrate is composed of a base substrate and the radiation pattern, wherein the base substrate is composed of a first magnetic sheet stacked on an uppermost portion, a second magnetic sheet stacked on a lowermost portion, and a third magnetic sheet interposed between the first magnetic sheet and the second magnetic sheet, wherein the radiation pattern is composed of a first loop pattern, a second loop pattern and a third loop pattern, wherein the first loop pattern is formed on an upper surface of the first magnetic sheet to be exposed to an outside of the radiation substrate, the second loop pattern is formed on an upper surface of the second magnetic sheet to be located inside the radiation substrate, and the third loop pattern is formed on an upper surface of the third magnetic sheet to be located inside the radiation substrate, wherein one end of the first loop pattern is connected with one end of the third loop pattern, and one end of the second loop pattern is connected with the other end of the third loop pattern, and wherein the second magnetic sheet is formed at a thicker thickness than the first magnetic sheet and the third magnetic sheet.

2. The near field communication antenna module according to claim 1, wherein the radiation substrate comprising:
a terminal portion formed on the upper surface of the first magnetic sheet stacked on the uppermost portion thereof, and connected with the other end of the first loop pattern of the first magnetic sheet stacked on the uppermost portion thereof; and
another terminal portion spaced apart from the terminal portion and formed on the upper surface of the first magnetic sheet stacked on the uppermost portion thereof, and connected with the other end of the second loop pattern of the second magnetic sheet stacked on the lowermost portion thereof through a via hole.

3. The near field communication antenna module according to claim 1, wherein the adhesive substrate is made of an aluminum material.

4. The near field communication antenna module according to claim 1, wherein the signal processing substrate comprising:
a printed circuit board;
a signal processing device mounted on an upper surface of the printed circuit board;
a circuit pattern formed on the printed circuit board, and connected with the signal processing device;
a terminal pattern formed on a lower surface of the printed circuit board, and connected to one end of the circuit pattern through a first via hole; and
another terminal pattern spaced apart from the terminal pattern and formed on the lower surface of the printed circuit board, and connected to the other end of the circuit pattern through a second via hole.

5. The near field communication antenna module according to claim 4, wherein the terminal pattern has one surface connected with a terminal portion formed on the upper surface of the radiation substrate, and another terminal pattern has one surface connected with another terminal portion formed on the upper surface of the radiation substrate.

6. The near field communication antenna module according to claim 1, further comprising a protection substrate stacked on the upper surface of the signal processing substrate.

* * * * *